United States Patent
Hareshbhai Niranjani et al.

(10) Patent No.: US 12,519,387 B2
(45) Date of Patent: Jan. 6, 2026

(54) SUPPLY SEQUENCE INDEPENDENT HIGH-VOLTAGE TOLERANT REGULATOR DISABLE CIRCUIT

(71) Applicant: STMicroelectronics International N.V., Geneva (CH)

(72) Inventors: Mayankkumar Hareshbhai Niranjani, Lathi (IN); Rik Paul, Bengaluru (IN); Rajesh Narwal, Greater Noida (IN)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 189 days.

(21) Appl. No.: 18/332,183

(22) Filed: Jun. 9, 2023

(65) Prior Publication Data
US 2024/0413742 A1    Dec. 12, 2024

(51) Int. Cl.
*H02M 1/36*     (2007.01)
*H02M 1/44*     (2007.01)
(Continued)

(52) U.S. Cl.
CPC ............... *H02M 1/36* (2013.01); *H02M 1/44* (2013.01); *H02M 3/155* (2013.01); *H02M 7/217* (2013.01)

(58) Field of Classification Search
CPC ........... H02M 3/33592; H02M 1/0009; H02M 1/4266
(Continued)

(56) References Cited

U.S. PATENT DOCUMENTS

| | | | | |
|---|---|---|---|---|
| 7,705,600 B1 * | 4/2010 | Byrkett | ................. | G11C 29/12 365/201 |
| 2005/0088152 A1 * | 4/2005 | McClure | ................. | G05F 3/247 323/272 |

(Continued)

FOREIGN PATENT DOCUMENTS

| | | |
|---|---|---|
| CN | 107924205 A | 4/2018 |
| CN | 108693905 A | 10/2018 |

OTHER PUBLICATIONS

EP 24174042.2 Extended European Search Report mailed Oct. 17, 2024.
(Continued)

*Primary Examiner* — Yemane Mehari
(74) *Attorney, Agent, or Firm* — Alston & Bird LLP

(57) ABSTRACT

An example power management unit utilizing an example circuit to disable a voltage regulator is provided. The example circuit includes a voltage selection circuit and a power-down switching device. The voltage selection circuit configured to receive a first voltage source and a second voltage source to output a selected voltage based on the higher of the two input voltages. The voltage selection circuit utilizes a first transistor electrically connected in parallel with a second transistor between the first voltage source and the second voltage source to generate the selected voltage. The second transistor gate voltage at the second transistor gate is generated based at least in part on a voltage at the first transistor drain. The selected voltage is generated based on a voltage at the second transistor drain. The power-down switching device is configured to generate a voltage for a voltage regulator based on the selected voltage.

20 Claims, 9 Drawing Sheets

(51) Int. Cl.
*H02M 3/155* (2006.01)
*H02M 7/217* (2006.01)

(58) Field of Classification Search
USPC .......................................................... 363/89
See application file for complete search history.

(56) References Cited

U.S. PATENT DOCUMENTS

| | | | |
|---|---|---|---|
| 2008/0054721 A1* | 3/2008 | Frew ........................ | H02J 1/10 |
| | | | 307/52 |
| 2017/0063369 A1 | 3/2017 | Boakye et al. | |
| 2017/0269622 A1* | 9/2017 | Takada .................... | G05F 1/573 |
| 2018/0284826 A1 | 10/2018 | Sautto et al. | |
| 2019/0196523 A1* | 6/2019 | Lu ........................... | G05F 1/468 |

OTHER PUBLICATIONS

Chinese Office Action for Application No. 202410659534.9, dated Aug. 8, 2025, 12 pages.

* cited by examiner

SUPPLY SEQUENCE INDEPENDENT HIGH-VOLTAGE TOLERANT REGULATOR DISABLE CIRCUIT

TECHNOLOGICAL FIELD

Embodiments of the present disclosure relate generally to disabling voltage regulators in a power management unit (PMU) of a system-on-chip (SoC), and more particularly, to circuitry for disabling a voltage regulator independent of the supply voltage sequence and tolerant to high voltages.

BACKGROUND

Various example embodiments address technical problems associated with disabling a voltage regulator, independent of control over the input power supplies and tolerant to high voltages. As understood by those of skill in the field to which the present disclosure pertains, there are numerous example scenarios in which a user may need to disable a voltage regulator independent of the supply of voltage received at the voltage regulator.

For example, a power management unit (PMU) is generally responsible for providing a stable source of power to a system-on-chip (SoC) electronic device. Many regulators may support multiple power domains, for example, a regulator may provide both a low voltage supply and a high voltage supply depending on the supplied power. In general, the PMU generates a low voltage power supply to be supplied to the core logic of the SoC. However, in some instances, the low voltage power supply may be provided by an external power supply. When the low voltage supply is supplied externally, the voltage regulator should be disabled. In an instance in which power is supplied by an external power supply, the change in power supplies may not be synchronized, potentially leading to undesirable electrical flow conditions.

Applicant has identified many technical challenges and difficulties associated with disabling a voltage regulator independent of supply voltages. Through applied effort, ingenuity, and innovation, Applicant has solved problems related to disabling voltage regulators by developing solutions embodied in the present disclosure, which are described in detail below.

BRIEF SUMMARY

Various embodiments are directed to an example circuit, and power management unit utilizing the example circuit to disable a voltage regulator. In some embodiments, the example circuit may comprise a voltage selection circuit configured to receive a first voltage source and a second voltage source, and further configured to output a selected voltage. In some embodiments, the voltage selection circuit may comprise a first transistor component having a first transistor component source, a first transistor component gate, and a first transistor component drain, wherein the first transistor component source is electrically connected to the first voltage source, and wherein the first transistor component gate is electrically connected to the first transistor component drain. In some embodiments, the voltage selection circuit may further comprise a second transistor component having a second transistor component source, a second transistor component gate, and a second transistor component drain, wherein the second transistor component source is electrically connected to the first voltage source, and wherein a second transistor gate voltage at the second transistor component gate is generated based at least in part on a first transistor component drain voltage at the first transistor component drain. In some embodiments, the selected voltage is generated based at least in part on a second transistor drain voltage at the second transistor component drain. The electrical circuit may further comprise a power-down switching device configured to generate a regulator gate voltage for a voltage regulator based at least in part on the selected voltage.

In some embodiments, the power-down switching device may further comprise a pull-up switching component having a pull-up transistor source, a pull-up transistor gate, and a pull-up transistor drain, wherein the pull-up transistor source is electrically connected to the selected voltage of the voltage selection circuit, and wherein the pull-up transistor gate is electrically connected to a power-down output signal of a power-down generator circuit.

In some embodiments, the power-down generator circuit may be configured to receive the first voltage source and a power-down signal, wherein the power-down generator circuit further comprises a power-down voltage divider electrically connected to the first voltage source and the power-down signal, wherein the power-down voltage divider is enabled by the power-down signal, and wherein the power-down voltage divider generates the power-down output signal based at least in part on a voltage difference between the first voltage source and the power-down signal.

In some embodiments, the voltage selection circuit further comprises a first voltage selection circuit voltage divider electrically connected to the first transistor component drain of the first transistor component and the second voltage source, wherein the first voltage selection circuit voltage divider is configured to generate a first voltage divided output based on a voltage difference between the first transistor component drain voltage at the first transistor component drain and the second voltage source. In some embodiments, the first voltage divided output may be electrically connected to the second transistor component gate of the second transistor component.

In some embodiments, the voltage selection circuit may further comprise a second voltage selection circuit voltage divider electrically connected to the selected voltage and a ground, wherein a second voltage selection circuit voltage divider tap is electrically connected to the second voltage source.

In some embodiments, the second voltage selection circuit voltage divider may comprise a second voltage selection circuit voltage divider first resistive component electrically connected to the selected voltage and the second voltage selection circuit voltage divider, the second voltage selection circuit voltage divider tap, and a second voltage selection circuit voltage divider second resistive component electrically connected to the ground and the second voltage selection circuit voltage divider tap. In some embodiments, a resistive value of the second voltage selection circuit voltage divider first resistive component may be greater than the resistive value of the second voltage selection circuit voltage divider second resistive component.

In some embodiments, the power-down voltage divider may comprise a power-down voltage divider first resistive component electrically connected to the first voltage source and the power-down output signal, a power-down voltage divider tap electrically connected to the power-down output signal; and a power-down voltage divider second resistive component electrically connected to the power-down voltage divider tap and the power-down signal.

In some embodiments, the power-down voltage divider further comprises a first power-down transistor component having a first power-down transistor component source, a first power-down transistor component gate, and a first power-down transistor component drain. In some embodiments, the first power-down transistor component drain is electrically connected to the power-down voltage divider tap, the first power-down transistor component source is electrically connected to the power-down voltage divider second resistive component, and the first power-down transistor component gate, and wherein the first power-down transistor component gate is further connected to a floating voltage supply block.

In some embodiments, the power-down voltage divider further comprises a second power-down transistor component having a second power-down transistor component source, a second power-down transistor component gate, and a second power-down transistor component drain. In some embodiments, the second power-down transistor component drain is electrically connected to the power-down voltage divider second resistive component, the second power-down transistor component gate is electrically connected to the power-down signal, and the second power-down transistor component source is electrically connected to ground.

In some embodiments, a conductive path diode may be electrically connected between the power-down voltage divider tap and the first power-down transistor component gate.

In some embodiments, the floating voltage supply block may generate a floating supply voltage based on a voltage output of the first voltage source.

In some embodiments, the first transistor component and the second transistor component may be p-type metal-oxide-semiconductor field-effect transistors.

In some embodiments, the first power-down transistor component and the second power-down transistor component may be n-type metal-oxide-semiconductor field-effect transistors.

In some embodiments, the voltage regulator may comprise an operational amplifier having a first input and a second input, wherein the first input is electrically connected to a reference voltage. In some embodiments, the voltage regulator may further comprise a voltage regulator transistor component having a voltage regulator transistor component source, a voltage regulator transistor component gate, and a voltage regulator transistor component drain.

In some embodiments, the voltage regulator transistor component source may be electrically connected to an output of the operational amplifier, the voltage regulator transistor component gate may be electrically connected to an output of the operational amplifier and to the regulator gate voltage; and the voltage regulator transistor component drain may be electrically connected to the second input of the operational amplifier.

In some embodiments an example power management unit utilizing an example circuit to disable a voltage regulator is further provided. In some embodiments, the example power management unit may comprise a transformer, a rectifier circuit electrically connected to the transformer, a filter circuit electrically connected to the rectifier circuit, and a voltage regulator. In some embodiments, the voltage regulator may comprise a voltage selection circuit configured to receive a first voltage source and a second voltage source, and further configured to output a selected voltage. In some embodiments, the voltage selection circuit may comprise a first transistor component having a first transistor component source, a first transistor component gate, and a first transistor component drain, wherein the first transistor component source is electrically connected to the first voltage source, and wherein the first transistor component gate is electrically connected to the first transistor component drain. In some embodiments, the voltage selection circuit may further comprise a second transistor component having a second transistor component source, a second transistor component gate, and a second transistor component drain. In some embodiments, the second transistor component source may be electrically connected to the first voltage source, and a second transistor component gate voltage at the second transistor component gate may be generated based at least in part on a first transistor component drain voltage at the first transistor drain. In some embodiments, the selected voltage may be generated based at least in part on a second transistor component drain voltage at the second transistor component drain. In some embodiments, the voltage regulator may further comprise a power-down switching device configured to generate a regulator gate voltage for the voltage regulator based at least in part on the selected voltage.

In some embodiments, the voltage regulator may further comprise an operational amplifier having a first input and a second input, wherein the first input may be electrically connected to a reference voltage. In some embodiments, the voltage regulator may further comprise a voltage regulator transistor component having a voltage regulator transistor component source, a voltage regulator transistor component gate, and a voltage regulator transistor component drain. In some embodiments, the voltage regulator transistor component source may be electrically connected to an output of the operational amplifier, the voltage regulator transistor component gate may be electrically connected to an output of the operational amplifier and to the regulator gate voltage, and the voltage regulator transistor component drain may be electrically connected to the second input of the operational amplifier.

In some embodiments, the power-down switching device may further comprise a pull-up switching component having a pull-up transistor source, a pull-up transistor gate, and a pull-up transistor drain. In some embodiments, the pull-up transistor source may be electrically connected to the selected voltage of the voltage selection circuit, and the pull-up transistor gate may be electrically connected to a power-down output signal of a power-down generator circuit.

In some embodiments, the power-down generator circuit may be configured to receive the first voltage source and a power-down signal, wherein the power-down generator circuit further comprises a power-down voltage divider electrically connected to the first voltage source and the power-down signal. In some embodiments, the power-down voltage divider may be enabled by the power-down signal, and the power-down voltage divider may generate the power-down output signal based at least in part on a voltage difference between the first voltage source and the power-down signal.

In some embodiments, the voltage selection circuit may further comprise a first voltage selection circuit voltage divider electrically connected to the first transistor component drain of the first transistor component and the second voltage source. In some embodiments, the first voltage selection circuit voltage divider may be configured to generate a first voltage divided output based on a voltage difference between the first transistor component drain voltage at the first transistor component drain and the second voltage source, and the first voltage divided output may be electrically connected to the second transistor component gate of the second transistor component.

In some embodiments, the voltage selection circuit may further comprise a second voltage selection circuit voltage divider electrically connected to the selected voltage and a ground, wherein a second voltage selection circuit voltage divider tap is electrically connected to the second voltage source.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

As described herein, the term "high" when referring to voltages indicates the identified voltage is above a certain minimum voltage threshold for the electronic device, generally between 1.8 volts and 3.6 volts. Similarly, the term "low" when referring to voltages indicates the identified voltage is below a certain voltage threshold for the electronic device, generally at or near 0 volts.

Various example embodiments address technical problems associated with disabling a voltage regulator, independent of synchronization with supply voltages. As understood by those of skill in the field to which the present disclosure pertains, there are numerous example scenarios in which a user may need to disable a voltage regulator independent of the supply of voltage received at the voltage regulator.

For example, a power management unit (PMU) is generally responsible for providing a stable source of power to a system-on-chip (SoC) electronic device. Many regulators may support multiple power domains, for example, a regulator may provide both a low voltage supply and a high voltage supply depending on the supplied power. In addition, in some instances, an SoC or other electronic device may support an externally supplied voltage source. In an instance in which the power supply is provided by an external voltage regulator, one or more voltage regulators of the PMU may need to be disabled.

Figure 1:
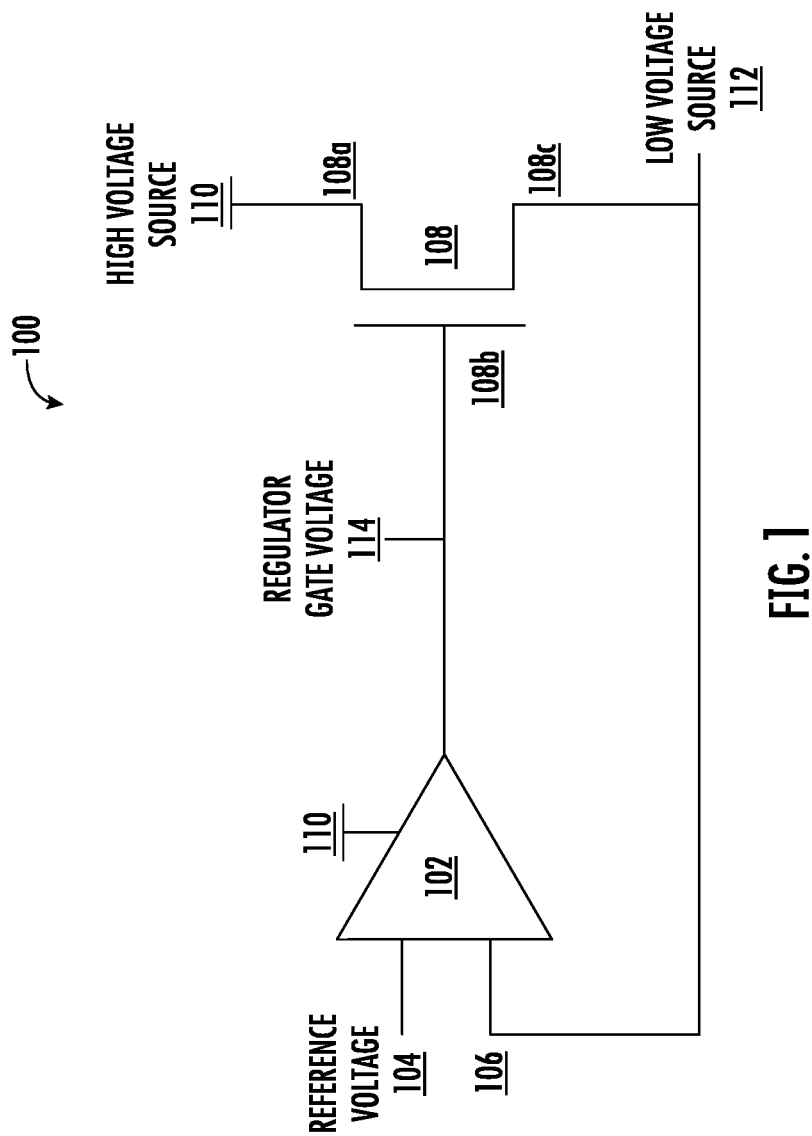
FIG. 1 illustrates an example voltage regulator in accordance with an example embodiment of the present disclosure.

Referring to FIG. 1, a common voltage regulator 100 is provided. As shown in FIG. 1, the common voltage regulator 100 comprises an op amp 102 having a first input terminal where a reference voltage 104 is received, and a second input terminal 106 configured to receive feedback from the drain terminal 108c of an electrically connected transistor (e.g., power MOSFET 108). In some embodiments, the reference voltage may be supplied by a bandgap circuit and may comprise a voltage at or near 900 millivolts, however, a reference voltage 104 may be received from any stable voltage source and may comprise a wide range of voltages. The op amp 102 may further receive power from a high voltage source 110. In some embodiments, the high voltage source 110 may comprise a voltage in a range from 1.8 volts to 3.6 volts, however, a high voltage source 110 may comprise a wide range of voltages with a peak voltage greater than the low voltage source 112. The op amp 102 depicted in FIG. 1, generates a regulator gate voltage 114 on an output. The output of the op amp 102 is electrically connected to a power metal-oxide-semiconductor field-effect-transistor (MOSFET) 108.

As shown in FIG. 1, the power MOSFET 108 includes three terminals, a source terminal 108a, a gate terminal 108b, and a drain terminal 108c. The source terminal 108a is the point at which, when enabled, current generally flows into the power MOSFET 108. As depicted in FIG. 1, the source terminal 108a is electrically connected to the high voltage source 110. The drain terminal 108c is the point at which the current generally flows out of the power MOSFET 108. As depicted in FIG. 1, the drain terminal 108c is electrically connected to the second input terminal 106 of the op amp 102. In addition, as depicted in FIG. 1, the drain terminal 108c of the power MOSFET 108 supplies the low voltage source 112 to the electrically connected device.

In general, the gate terminal 108b of a MOSFET is used to control the flow of current between the source terminal 108a and the drain terminal 108c. In some embodiments, a gate terminal voltage at or near the voltage at the source terminal 108a may be applied to turn off the MOSFET and stop the flow of current through the MOSFET. Conversely, a gate terminal voltage that creates a voltage difference between the gate terminal and the source terminal may turn on the MOSFET and allow the flow of current through the MOSFET.

When a power supply is supplied externally, a voltage regulator, for example the voltage regulator 100 shown in FIG. 1, may be disabled. For example, in an instance in which the voltage regulator 100 supplies the low voltage power source to the electrically connected device, the voltage regulator 100 may be disabled. However, because of the asynchronous nature of the external power source, the high voltage source 110 may be enabled and providing power at a voltage higher than the low voltage source 112, or, alternatively, the high voltage source 110 may be disabled at a voltage at or near 0.

The state of the high voltage source 110 when the voltage regulator 100 is disabled is important in determining the regulator gate voltage 114 necessary to disable the power MOSFET 108. For example, in an instance in which the high voltage source 110 is at 0 volts, if the regulator gate voltage 114 is pulled to the high voltage source 110 in an attempt to turn off the MOSFET, the voltage at the gate terminal 108$b$ (0 volts) and at the source terminal 108$a$ (0 volts) are both lower than the voltage at the drain terminal 108$c$. Thus, current may flow from the low voltage source 112 into the high voltage source 110, which is undesirable.

In addition, in some embodiments, the maximum voltage rating of one or more of the electrical components may be less than the voltage provided by the high voltage source 110. In such an embodiment, electrical components may be damaged or destroyed if the voltage drop across the component is greater than the maximum voltage rating.

The various example embodiments described herein utilize various techniques to ensure a voltage regulator is properly disabled in an instance in which the voltage source is provided by an external, asynchronous source. For example, in some embodiments, a voltage selection circuit is provided to generate a selected voltage that is the higher of the two supply voltages. In addition, the voltage selection circuit ensures that the voltage drop across the electrical components does not exceed the maximum voltage rating of the electrical components, for example, 1.8 volts.

In some embodiments, a power-down generator circuit is further provided. In general, a power-down generator circuit may be configured to relay a power-down signal from the logic domain of the electronic device and enable the selected voltage supply to the voltage regulator. However, in some embodiments, the power-down signal may be adjusted based on the selected voltage. For example, in some embodiments, the selected voltage may be greater than the maximum voltage rating of the electrical components of a power-down switching device, such as a transistor. In such an embodiment, the power-down signal may be adjusted to prevent a voltage drop across the electrical components greater than the maximum voltage rating of the electrical components.

As a result of the herein described example embodiments and in some examples, the performance of a voltage regulator may be greatly improved. In addition, electrical components having a maximum voltage rating lower than the voltage of a high voltage source may be utilized.

Figure 2:
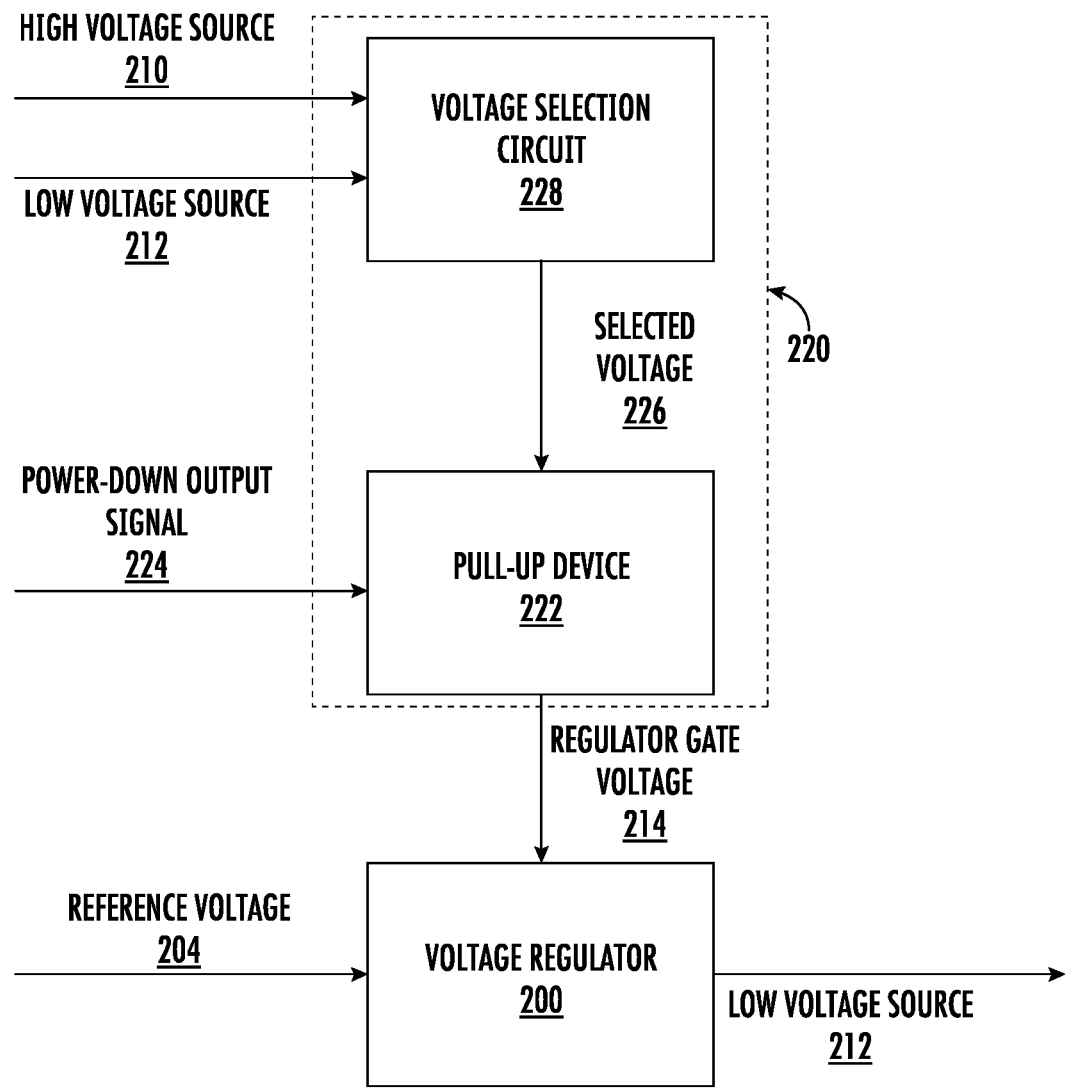
FIG. 2 illustrates an example block diagram of an example supply voltage independent voltage regulator disable circuit in accordance with an example embodiment of the present disclosure.

Referring now to FIG. 2, an example supply voltage independent voltage regulator disable circuit 220 is provided. As shown in FIG. 2, the example supply voltage independent voltage regulator disable circuit 220 supplies a regulator gate voltage 214 to an electrically connected voltage regulator 200, the voltage regulator 200 further configured to receive a reference voltage 204. The regulator gate voltage 214 is supplied by a power-down switching device 222 electrically connected to the voltage regulator 200. The power-down switching device 222 is configured to output the regulator gate voltage 214 based on a power-down output signal 224 and a selected voltage 226 supplied by an electrically connected voltage selection circuit 228. The voltage selection circuit 228 is configured to select the selected voltage 226 based on output voltages received from an electrically connected high voltage source 210 and an electrically connected low voltage source 212.

As depicted in FIG. 2, the supply voltage independent voltage regulator disable circuit 220 supplies a regulator gate voltage 214 to a voltage regulator 200. As described in relation to FIG. 1, the voltage regulator 200 may be any electronic component or device comprising hardware, firmware, software, or a combination thereof and configured to receive a reference voltage 204 and output a stable, consistent voltage within a specified range based on the reference voltage 204. The voltage regulator 200 may comprise a linear regulator, a switch regulator, a low-dropout regulator, a fixed voltage regulator, an adjustable voltage regulator, or similar type regulator. As described in relation to FIG. 1, the voltage regulator 200 may be controlled by a regulator gate voltage 214. In an instance in which the regulator gate voltage 214 is at or near the voltage at the source terminal of the internal switch device (e.g., power MOSFET 108), the switch device is turned off and the output voltage from the voltage regulator 200 is stopped. Conversely, in an instance in which the regulator gate voltage 214 creates a voltage difference between the gate terminal and the source terminal of the switch device, the voltage regulator 200 is turned on and an output voltage from the voltage regulator 200 is generated.

As further depicted in FIG. 2, the supply voltage independent voltage regulator disable circuit 220 comprises a power-down switching device 222. A power-down switching device 222 may be any electrical component, plurality of components, or device, configured to control the passage of the selected voltage 226 from the voltage selection circuit 228 to the voltage regulator 200. In some embodiments, the power-down switching device 222 may comprise a MOSFET, a bipolar junction transistor (BJT), a switch, or other switching device. In some embodiments, the power-down switching device 222 may be a short, or resistor, allowing the selected voltage 226 or a portion of the selected voltage 226 to pass without switching. An example power-down switching device 222 is further provided in FIG. 3.

In some embodiments, the power-down switching device 222 may be enabled by a power-down output signal 224. A power-down output signal 224 may be any electrical signal or series of signals providing indication to disable the voltage regulator 200. For example, a power-down output signal 224 may be asserted when the voltage regulator 200 is to be powered down. In some embodiments, the voltage of the power-down output signal 224 may be elevated above a pre-determined minimum voltage to indicate power down. In some embodiments, the voltage of the power-down output signal 224 may be dropped below a pre-determined maximum voltage to indicate power down. In some embodiments, the voltage of the power-down output signal 224 may be altered by a power-down generator circuit (as described in relation to FIG. 3) to protect the electrical components comprising the power-down switching device 222, and other electrical components, from exposure to high voltages exceeding the maximum voltage rating of the underlying semiconductor technology.

As further depicted in FIG. 2, the supply voltage independent voltage regulator disable circuit 220 further comprises a voltage selection circuit 228. A voltage selection circuit 228 may be any electrical components, including hardware, firmware, software, or any combination thereof configured to determine a selected voltage 226 based at least in part on the higher voltage between the high voltage source 210 and the low voltage source 212. In some embodiments, an external low voltage source 212 may supply the low voltage within an electronic device. In an instance in which the low voltage is supplied by an external low voltage source 212, the internal voltage regulator 200 responsible for providing a low voltage source to the electronic device may be disabled. In such an embodiment, the high voltage source 210 may output a high voltage, no voltage, or any voltage in between. In an instance in which the low voltage source 212 is provided but the high voltage source 210 is at or near 0 volts, disabling the voltage regulator 200 by tying the regulator gate voltage 214 to the high voltage source 210 may result in a voltage at the drain terminal of the power MOSFET (e.g., power MOSFET 108) within the voltage regulator 200 that is higher than the voltage at the gate terminal and the voltage at the source terminal. This scenario may result in current flowing from the low voltage source 212 to the high voltage source 210, which may be undesirable. Thus, the voltage selection circuit 228 may not simply provide a selected voltage 226 equal to the high voltage source 210 but may select the selected voltage 226 based on the greater of the high voltage source 210 and the low voltage source 212. Example embodiments of the voltage selection circuit 228 are described in further detail in relation to FIG. 4 and FIG. 6.

Figure 3:
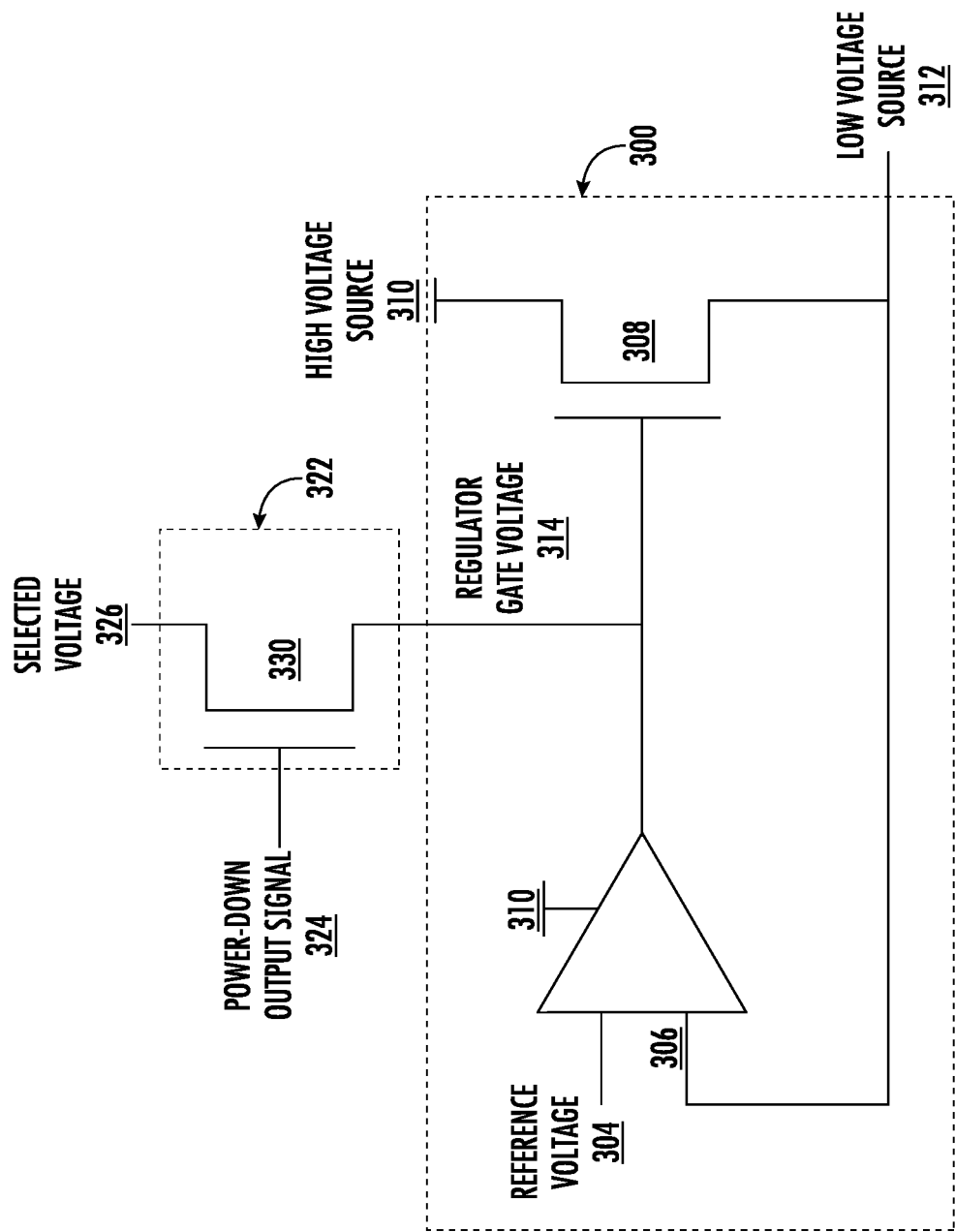
FIG. 3 illustrates an example embodiment of a power-down switching device interfacing with a voltage regulator in accordance with an example embodiment of the present disclosure.

Referring now to FIG. 3, an example power-down switching device 322 component of a supply voltage independent voltage regulator disable circuit (e.g., supply voltage independent voltage regulator disable circuit 220) is provided. As depicted in FIG. 3, the example power-down switching device 322 comprises a pull-up transistor 330 (e.g., pull-up switching component). The pull-up transistor 330 is electrically connected to the selected voltage 326 output of a voltage selection circuit (e.g., voltage selection circuit 228 as depicted in FIG. 2) at the source terminal and the regulator gate voltage 314 of the voltage regulator 300 at the drain terminal. In addition, the pull-up transistor 330 depicted in FIG. 3 is electrically connected to a power-down output signal 324 at the gate terminal of the pull-up transistor 330.

As depicted in FIG. 3, the example power-down switching device 322 includes a pull-up transistor 330. Although depicted as a pull-up transistor 330 in FIG. 3, a pull-up switching component may be any transistor, MOSFET, BJT, or other switching device that enables control of the regulator gate voltage 314 based on the selected voltage 326 and the power-down output signal 324. As depicted, the pull-up transistor 330 enables the selected voltage 326 to be applied at the gate of the voltage regulator transistor 308 of the voltage regulator 300, thus disabling the flow of current through the voltage regulator transistor 308.

For example, in some embodiments, the high voltage source 310 may be high (e.g., between 1.8 volts and 3.6 volts) when the power-down output signal 324 is asserted. In such an instance, the pull-up transistor 330 is enabled and the flow of current through the pull-up transistor 330 increases the regulator gate voltage 314 to the selected voltage 326, which is equivalent to the voltage (high voltage source 310) at the source of the voltage regulator transistor 308. Thus, the flow of current at the voltage regulator transistor 308 and into the low voltage source 312 is disabled. Similarly, in some embodiments, the high voltage source 310 may be low (e.g., at or near 0 volts) when the power-down output signal 324 is asserted. In such an instance, the pull-up transistor 330 is enabled and the flow of current through the pull-up transistor 330 increases the regulator gate voltage 314 to the selected voltage 326, which is equivalent to the voltage (low voltage source 312) at the drain of the voltage regulator transistor 308. Thus, the flow of current at the voltage regulator transistor 308 is disabled and current flow from the low voltage source 312 to the high voltage source 310 through the voltage regulator transistor 308 is prevented.

Figure 4:
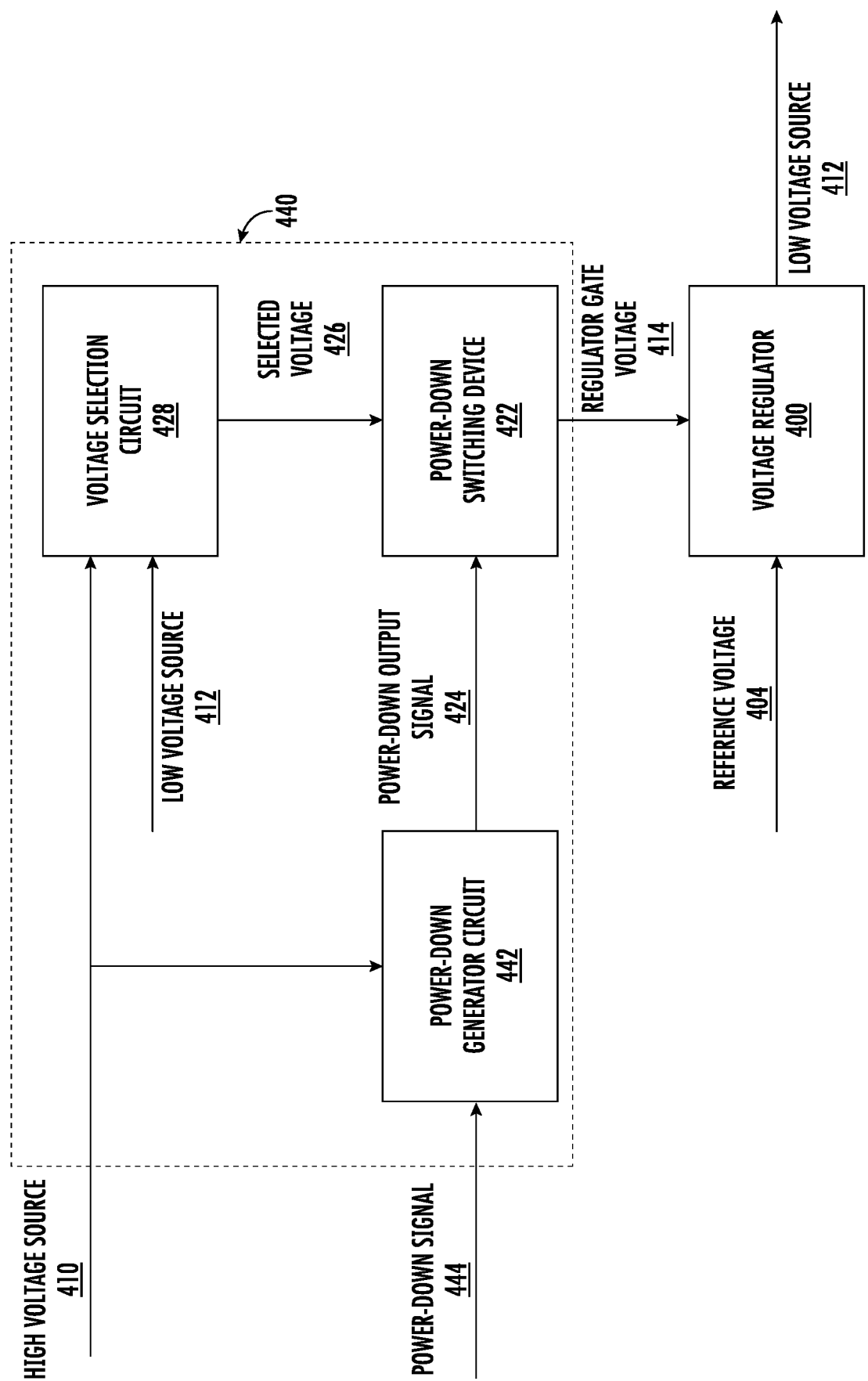
FIG. 4 illustrates an example block diagram of an example supply voltage independent voltage regulator disable circuit including an example power-down generator circuit in accordance with an example embodiment of the present disclosure.

Referring now to FIG. 4, an example supply voltage independent voltage regulator disable circuit 440 is provided. As depicted in FIG. 4, the example supply voltage independent voltage regulator disable circuit 440 includes a voltage selection circuit 428 electrically connected to a high voltage source 410 and a low voltage source 412 and generating a selected voltage 426 based on the high voltage source 410 and the low voltage source 412. In addition, the example supply voltage independent voltage regulator disable circuit 440 includes a power-down switching device 422 receiving the selected voltage 426 from the electrically connected voltage selection circuit 428 and further receiving a power-down output signal 424 from an electrically connected power-down generator circuit 442. As depicted in FIG. 4, the power-down generator circuit 442 is electrically connected to the high voltage source 410 and is further configured to receive a power-down signal 444. As further depicted in FIG. 4, the power-down switching device 422 is configured to generate a regulator gate voltage 414 supplied to an electrically connected voltage regulator 400.

As depicted in FIG. 4, the example supply voltage independent voltage regulator disable circuit 440 includes a power-down generator circuit 442 configured to receive a power-down signal 444. A power-down generator circuit 442 may be any hardware, firmware, software, or combination thereof configured to receive a power-down signal 444 and apply necessary adjustments to the power-down signal 444 to avoid damage to electrical components due to high voltages. A power-down signal 444 may be any signal or sequence of signals providing an indication to power-down one or more electrically connected components, such as voltage regulator 400.

For example, in some embodiments, the electrical components of the supply voltage independent voltage regulator disable circuit 440 may support a maximum voltage of 1.8 volts. In an instance in which the high voltage source is greater than 1.8 volts, for example 3.6 volts, some electrical components may be exposed to a voltage difference greater than the maximum 1.8 volts. For example, a power-down switching device 422 may comprise one or more transistors (e.g., pull-up transistor 330 as depicted in FIG. 3) having a maximum voltage rating of 1.8 volts. In an instance in which the high voltage source 410 is greater than 1.8 volts (e.g., 3.6 volts) and the power-down output signal 424 is low (e.g., 0 volts), the voltage difference across the one or more transistors may be greater than 1.8 volts causing stress on and potentially damaging the one or more transistors. Thus, the power-down generator circuit 442, in some embodiments, may adjust the power-down signal 444 to avoid exceeding the maximum voltage rating of the electrical components of the supply voltage independent voltage regulator disable circuit 440, the voltage regulator 400, and other electrically connected components.

Figure 5:
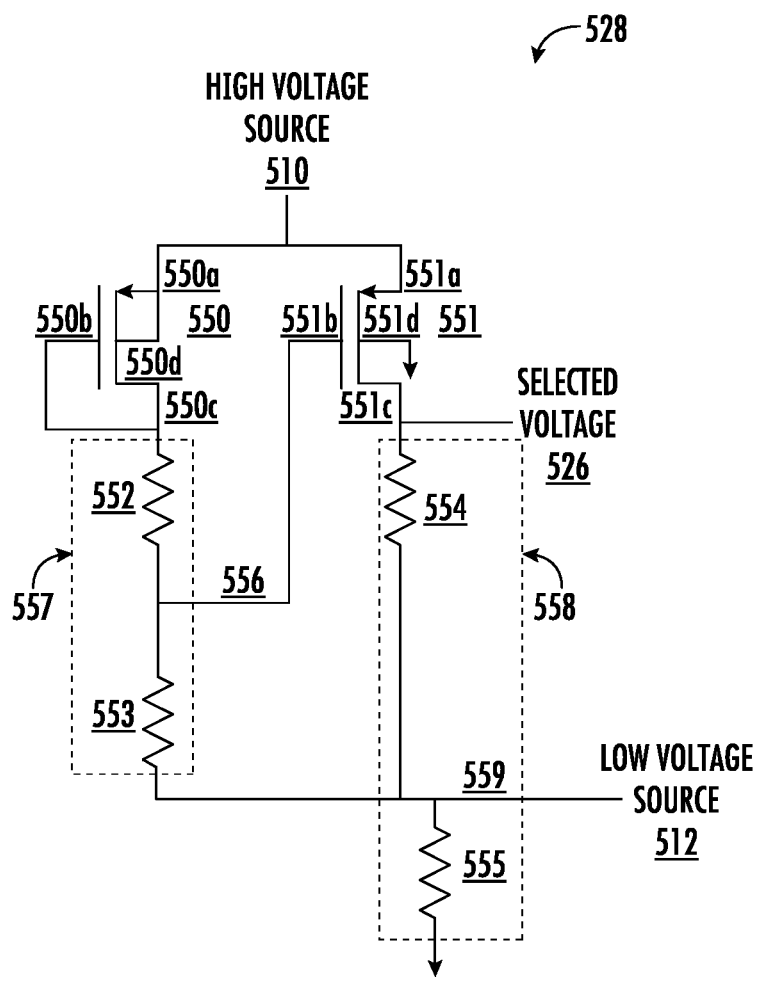
FIG. 5 illustrates an example embodiment of a voltage selection circuit in accordance with an example embodiment of the present disclosure.

Referring now to FIG. 5, a specific embodiment of an example voltage selection circuit 528 is provided. As depicted in FIG. 5, the example voltage selection circuit 528 includes a first transistor 550 (e.g., first transistor component) and a second transistor (e.g., second transistor component) wherein the source terminal 550a, 551a of each transistor 550, 551 are electrically connected to the high voltage source 510. As further depicted in FIG. 5, a first voltage divider 557 (e.g., first voltage selection circuit voltage divider) having a first resistor 552, a second resistor 553, and a first voltage divider tap 556 (e.g., first voltage divided output) electrically connected to the first voltage divider 557 between the first resistor 552 and the second resistor 553 is electrically connected between the drain terminal 550c of the first transistor 550 and the low voltage source 512. In addition, the drain terminal 550c of the first transistor 550 is electrically connected to the gate terminal 550b of the first transistor 550. As further depicted in FIG. 5, the first voltage divider tap 556 is electrically connected to the gate terminal 551b of the second transistor 551. In addition, a second voltage divider 558 (e.g., second voltage selection circuit voltage divider) having a first resistor 554 (e.g., second voltage selection circuit voltage divider first resistive component), a second resistor 555 (e.g., second voltage selection circuit voltage divider second resistive component), and a second voltage divider tap 559 (e.g., second voltage circuit voltage divider tap) electrically connected to the second voltage divider 558 between the first resistor 554 and the second resistor 555 is electrically connected between the drain terminal 551c of the second transistor 551 and ground. As further depicted in FIG. 5, the low voltage source 512 is electrically connected to the second voltage divider tap 559. In addition, the selected voltage 526 output is supplied by making an electrical connection at the drain terminal 551c of the second transistor 551.

As depicted in FIG. 5, the example voltage selection circuit 528 includes a first transistor 550. Although depicted as a transistor, the first transistor 550 may be any transistor, MOSFET, BJT, or other switching device that prevents the flow of current from the low voltage source 512 to the high voltage source 510 when a voltage from the low voltage source 512 is present and a voltage from the high voltage source 510 is not. In such an instance, the voltage at the gate terminal 550b is equivalent to the voltage at the drain terminal 550c (e.g., at or near the voltage of the low voltage source 512) and greater than the voltage at the source terminal 550a (e.g., approximately 0 volts), thus the first transistor 550 is disabled. Further, in an instance in which the high voltage source 510 is high, the voltage at the source terminal 550a of the first transistor 550 is higher than the voltage at the gate terminal 550b of the first transistor 550 and the first transistor 550 is turned on. In such an instance, a voltage drop exists across the first transistor 550 and the first voltage divider 557 as described further herein.

As further depicted in FIG. 5, the example voltage selection circuit 528 includes a first voltage divider 557 electrically connected between the drain terminal 551c of the first transistor 550 and the low voltage source 512. A voltage divider 557 may be any hardware, firmware, software, or combination thereof configured to provide a reduced voltage level based on the voltage drop across the voltage divider 557. As depicted in FIG. 5, the first voltage divider 557 comprises a plurality of resistors (e.g., first resistor 552 and second resistor 553) connected in series. The first voltage divider 557 further includes a tap output provided by supplying an electrical contact to a point between the two resistors (e.g., first voltage divider tap 556). The voltage at the first voltage divider tap 556 may be determined based on the value of the two resistors and the voltage drop across the voltage divider 557. For example, the voltage at the first voltage divider tap 556 may be equal to:

$$V_{TAP} = V_{DIV} \cdot \frac{R_2}{(R_1 + R_2)}$$

where $V_{DIV}$ is the voltage drop across the voltage divider, $V_{TAP}$ is the voltage drop across the resistor $R_2$, $R_2$ is the resistance of the second resistor (e.g., second resistor 553), and $R_1$ is the resistance of the first resistor (e.g., first resistor 552). By electrically connecting the first voltage divider 557 between the high voltage source 510 and the low voltage source 512, in an instance in which the first transistor 550 is enabled, a reduced voltage level is generated at the first voltage divider tap 556 based on the resistance values of first resistor 552 and second resistor 553 and provided to the gate terminal 551b of the second transistor 551.

For example, as depicted in FIG. 5, the voltage at the tap ($V_{556}$) of the first voltage divider 557 may be determined as follows:

$$V_{556} = V_{512} \cdot \frac{R_{552}}{(R_{552} + R_{553})} + \frac{R_{553}}{(R_{552} + R_{553})}(V_{510} - V_{GS\_550})$$

where $V_{512}$ is the voltage at the low voltage source 512, $V_{510}$ is the voltage at the high voltage source 510, $V_{GS\_550}$ is the voltage drop from the gate terminal 551b to the source terminal 551a of the first transistor 550, $R_{552}$ is the resistance of the first resistor 552, and $R_{553}$ is the resistance of the second resistor 553. In some embodiments, the second resistor 553 may have a resistance of 75000 ohms, while the first resistor 552 may have a resistance of 5000 ohms.

As further depicted in FIG. 5, the example voltage selection circuit 528 includes a second transistor 551. Although depicted as a transistor, the second transistor 551 may be any transistor, MOSFET, BJT, or other switching device that allows the flow of current through when the voltage at high voltage source 510 is high and prevents the flow of current in an instance in which the high voltage source is low. Thus, when the voltage at high voltage source 510 is high, the voltage received from the first voltage divider tap 556 will be sufficiently lower than the high voltage source 510 at the gate terminal 551b of the second transistor 551, such that the second transistor 551 will be enabled and the selected voltage will be at or near the voltage of the high voltage source 510. In an instance in which the high voltage source 510 is low, the second transistor 551 will be off, or disabled, such that the selected voltage 526 is at or near the voltage of the low voltage source 512.

As depicted in FIG. 5, the first transistor 550 and the second transistor 551 utilize fully depleted silicon-on-insulator (FDSOI) technology. In general, FDSOI technology enables adjustments to the threshold voltage of a transistor to be made by applying a bias voltage to the bulk terminal (e.g., bulk terminal 550d, bulk terminal 551d) of the transistor. For p-type MOSFET transistors, increasing the voltage applied to the bulk terminal may increase the threshold voltage. Conversely, for n-type MOSFET transistors, increasing the voltage applied to the bulk terminal may decrease the threshold voltage. As depicted in FIG. 5, electrically connecting the bulk terminal of the p-type MOSFETs to ground decreases the threshold voltage. As shown in FIG. 5, the bulk terminal 550d of first transistor 550 is electrically connected to the high voltage source 510, thus increasing the threshold voltage of first transistor 550 and the bulk terminal 551d of second transistor 551 is electrically connected to ground, thus decreasing the threshold voltage of second transistor 551. Biasing first transistor 550 and second transistor 551 in this way ensures the second transistor 551 is strongly on when the high voltage source 510 is high.

In some embodiments, both the first transistor 550 and the second transistor 551 may comprise p-type transistors.

As further depicted in FIG. 5, the example voltage selection circuit 528 includes a second voltage divider 558 electrically connected between the drain terminal 551c of the second transistor 551 and ground. The second voltage divider 558 may be any hardware, firmware, software, or combination thereof configured to prevent the flow of current from the high voltage source 510 to the low voltage source 512 in an instance in which the high voltage source 510 is high and the regulator is disabled, such that the low voltage source 512 is low. As depicted in FIG. 5, the second voltage divider 558 comprises a plurality of resistors (e.g., first resistor 554 and second resistor 555) connected in series. The second voltage divider 558 further includes a tap output provided by supplying an electrical contact to a point between the two resistors (e.g., second voltage divider tap 559). In some embodiments, the resistance value of second resistor 555 may be much less than the resistance value of the first resistor 554. For example, the second resistor 555 may have a resistance of 180 ohms, while the first resistor 554 may have a resistance of 200000 ohms. By utilizing a second voltage divider 558 wherein the second resistor 555 is much smaller than the first resistor 554, the low voltage source 512 may be kept close to ground in an instance in which the low voltage source 512 is not provided, and may be protected from receiving charge from the high voltage source 510 when the second transistor 551 is enabled.

As further depicted in FIG. 5, the example voltage selection circuit 528 may enable the use of voltages greater than the maximum tolerable voltage difference across two terminals of the underlying electrical components. For example, in an instance in which the maximum tolerable voltage difference across two terminals of the first transistor 550 and the second transistor 551 is 1.8 volts, and the high voltage source 510 is 3.6 volts, the transistors may be protected from a voltage difference of more than 1.8 volts at any of the terminals. To illustrate, in an instance in which the high voltage source 510 is high (e.g., 3.6 volts), the first voltage divider 557 ensures that the voltage at the drain terminal 550c and thus the gate terminal 550b is at or near 3.6 volts, thus, none of the terminals on the first voltage divider 557 exceed the maximum tolerable voltage difference across two terminals. Similarly, since the second resistor 553 is greater than the first resistor 552, the first voltage divider tap 556 supplied to the gate terminal 551b of the gate terminal is sufficiently close to the high voltage source 510 as to not exceed the maximum tolerable voltage difference across two terminals of the second transistor 551.

Figure 6:
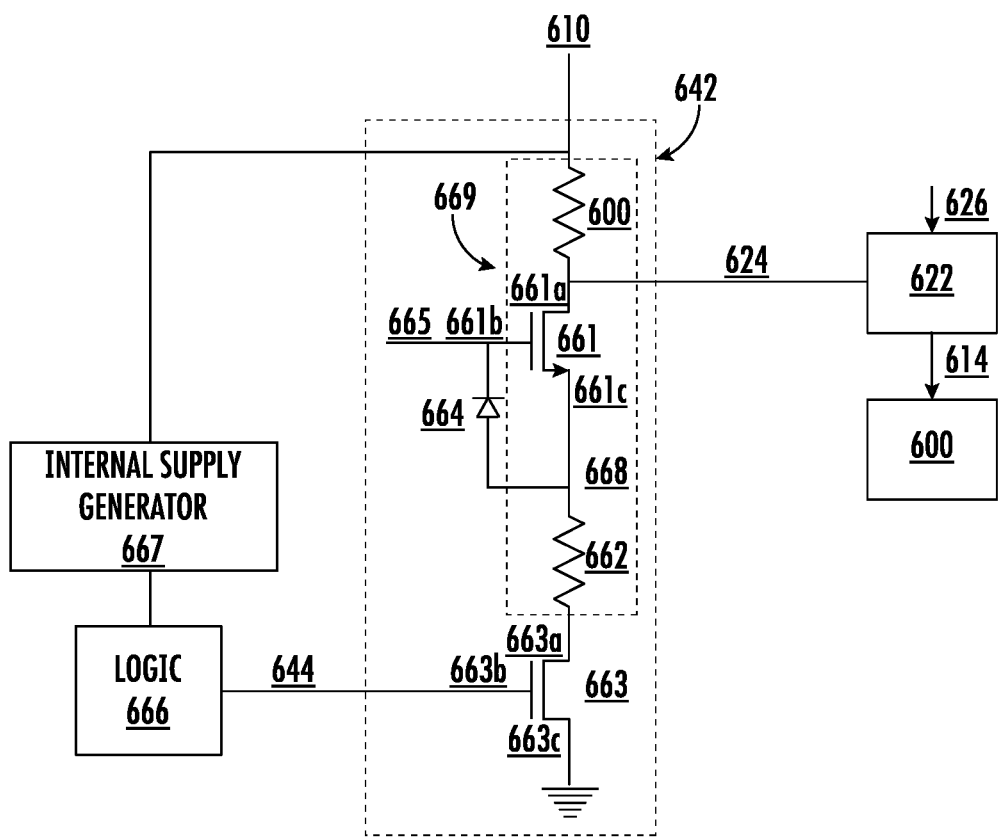
FIG. 6 illustrates an example embodiment of a power-down generator circuit in accordance with an example embodiment of the present disclosure.

Referring now to FIG. 6, an example power-down generator circuit 642 of an example supply voltage independent voltage regulator disable circuit is provided. As depicted in FIG. 6, the example power-down generator circuit 642 includes a voltage divider 669 (e.g., power-down voltage divider) comprising a first resistor 660 (e.g., power-down voltage divider first resistive component), a second resistor 662 (e.g., power-down voltage divider second resistive component), and a tap 668 (e.g., power-down voltage divider tap). Further, the example power-down generator circuit 642 includes a first transistor 661 (e.g., first power-down transistor component) electrically connected to the first resistor 660 at the drain terminal 661a and the second resistor 662 at the source terminal 661c. The power-down generator circuit 642 further comprises a conductive path diode 664 electrically connected at the anode end to the source terminal 661c of the first transistor 661, and electrically connected at the cathode end to the gate terminal 661b of the first transistor 661. In addition, a floating voltage supply 665 is electrically connected to the gate terminal 661b of the first transistor 661. As further depicted in FIG. 6, a second transistor 663 (e.g., second power-down transistor component) is electrically connected between the second resistor 662 and ground. Further, a power-down signal 644 is electrically connected to the gate terminal 663b of the second transistor 663 as provided by electrically connected logic circuitry 666 and an electrically connected internal supply generator 667. Further depicted in FIG. 6, the high voltage source 610 is electrically connected to the first resistor 660 of the voltage divider 669, and the power-down output signal 624 is provided to the power-down switching device 622 through an electrical connection to the drain terminal 661a of the first transistor 661.

As depicted in FIG. 6, the power-down generator circuit 642 receives a power-down signal 644 from logic circuitry 666 located on or near an electronic device utilizing the high voltage source 610. In some embodiments, the logic circuitry 666 receives a power supply from an internal supply generator 667 that may be a reduced voltage from the high voltage source 610. For example, in some embodiments, the high voltage source may be 3.6 volts, while the power supply provided to the logic circuitry 666 by the internal supply generator is only 1.8 volts. The logic circuitry 666 may be configured to generate a power-down signal 644 providing an indication to power-down the voltage regulator 600. For example, in some embodiments, the logic circuitry 666 may assert, or raise the voltage of the power-down signal 644 to initiate the power-down of the voltage regulator 600, and de-assert, or set the voltage of the power-down signal 644 to 0 volts, to enable the voltage regulator 600.

However, in some embodiments, the power-down signal 644 may operate in the reduced voltage range provided by the internal supply generator 667 (e.g., 0 to 1.8 volts). In such an instance, the power-down generator circuit 642 may alter the signal to prevent exceeding the maximum tolerable voltage difference across two terminals of any electrical devices when the high voltage source 610 is in excess of the maximum tolerable voltage difference across two terminals of the electrical components. For example, in an instance in which the high voltage source 610 is 3.6 volts, and the power-down signal 644 is 0 volts, if the power-down signal was provided directly to the power-down switching device 622 where the selected voltage 626 was equivalent to the high voltage source 610 (e.g., 3.6 volts) then the voltage difference between the gate terminal at the power-down switching device 622 and the source terminal may be 3.6 volts which is greater than the maximum tolerable voltage difference across two terminals of the power-down switching device 622. Thus, the power-down generator circuit 642 may shift the power domain of the power-down signal 644 to be equivalent to the high voltage source 610 when the voltage regulator 600 is to be disabled, and half of the high voltage source 610 when the voltage regulator 600 is to be enabled.

As further depicted in FIG. 6, the power-down generator circuit 642 includes a voltage divider 669 comprising a first resistor 660 and a second resistor 662. The first resistor 660 and the second resistor 662 create a voltage divider from which the power-down output signal 624 is generated. In some embodiments, the first resistor 660 and the second resistor 662 may be nearly equivalent. In such an instance, the voltage at the tap 668 is half the value of the high voltage source 610 when the opposite end of the voltage divider 669 is electrically connected to ground.

As further depicted in FIG. 6, the voltage divider 669 is essentially enabled by the power-down signal 644 at the second transistor 663. As shown in FIG. 6, the second transistor 663 is an n-type transistor and is electrically connected between the second resistor 662 of the voltage divider 669 and ground. In an instance in which the power-down signal 644 is low (e.g., 0 volts), the second transistor 663 is turned off, and the voltage at the high voltage source 610 is output as the power-down output signal 624. In such an instance, the power-down output signal 624 and the selected voltage 626 are both essentially equal to the high voltage source 610 and the power-down switching device 622 is disabled, allowing the voltage regulator 600 to continue to operate. Conversely, in an instance in which the power-down signal 644 is high (e.g., 1.8 volts, indicating voltage regulator 600 to power down), the second transistor 663 is turned on, thus, the voltage divider 669 is connected to ground and the voltage divider 669 activated. In such an instance, the power-down output signal 624 is equivalent to approximately one-half of the high voltage source 610, while the selected voltage 626 remains at the high voltage source 610. Thus, the power-down switching device 622 is enabled, the high voltage source 610 is transmitted through the power-down switching device 622 as the regulator gate voltage 614, and the voltage regulator 600 is disabled.

As further depicted in FIG. 6, the power-down generator circuit 642 includes a first transistor 661 electrically connected to the first resistor 660 at the drain terminal 661a, to the second resistor 662 at the source terminal 661c, and to the floating voltage supply 665 at the gate terminal 661b. In an instance in which the high voltage source 610 exceeds the maximum tolerable voltage difference across two terminals of the electrical components (e.g., second transistor 663), the electrical components may be damaged if the voltage difference across the component is greater than the maximum tolerable voltage difference across two terminals of the component. For example, if the high voltage source is 3.6 volts, and the maximum tolerable voltage difference across two terminals of the second transistor 663 is 1.8 volts, if the voltage at the source terminal 663a was allowed to exceed 1.8 volts and the power-down signal 644 was held at 0 volts, the second transistor 663 may be damaged. The purpose of the first transistor 661 may be to protect the second transistor 663 from such a situation. As depicted in FIG. 6, the gate terminal 661b of the first transistor 661 is electrically connected to a floating voltage supply 665. The floating voltage supply 665 depicted in FIG. 6 generates a bias voltage based on the voltage of the high voltage source 610. For example, in an instance in which the high voltage source 610 exceeds a voltage threshold (e.g., 2 volts), the floating voltage supply 665 generates a voltage equivalent to one-half of the high voltage source 610. However, when the high voltage source 610 is less than or equal to the voltage threshold, the floating voltage supply 665 generates a voltage equivalent to the high voltage source. Thus, by biasing the voltage at the gate terminal 661b of the first transistor 661 according to the floating voltage supply 665, the voltage at the tap 668 and the source of the second transistor 663 may be held below the maximum tolerable voltage difference across two terminals of the second transistor 663.

In some embodiments, both the first transistor 661 and the second transistor 663 may comprise n-type transistors.

As further depicted in FIG. 6, the example power-down generator circuit 642 includes a conductive path diode 664 with the anode electrically connected to the source terminal 661c of the first transistor 661, and the cathode electrically connected to the gate terminal 661b of the first transistor 661. A conductive path diode 664 may be any electronic device that allows the flow in only one direction, from the anode to the cathode. As depicted in FIG. 6, the conductive path diode 664 further protects the second transistor 663 by preventing any increase in voltage above the bias voltage of the floating voltage supply 665 at the tap 668 and/or source terminal 663a of the second transistor 663 due to leakage or other factors.

Figure 7:
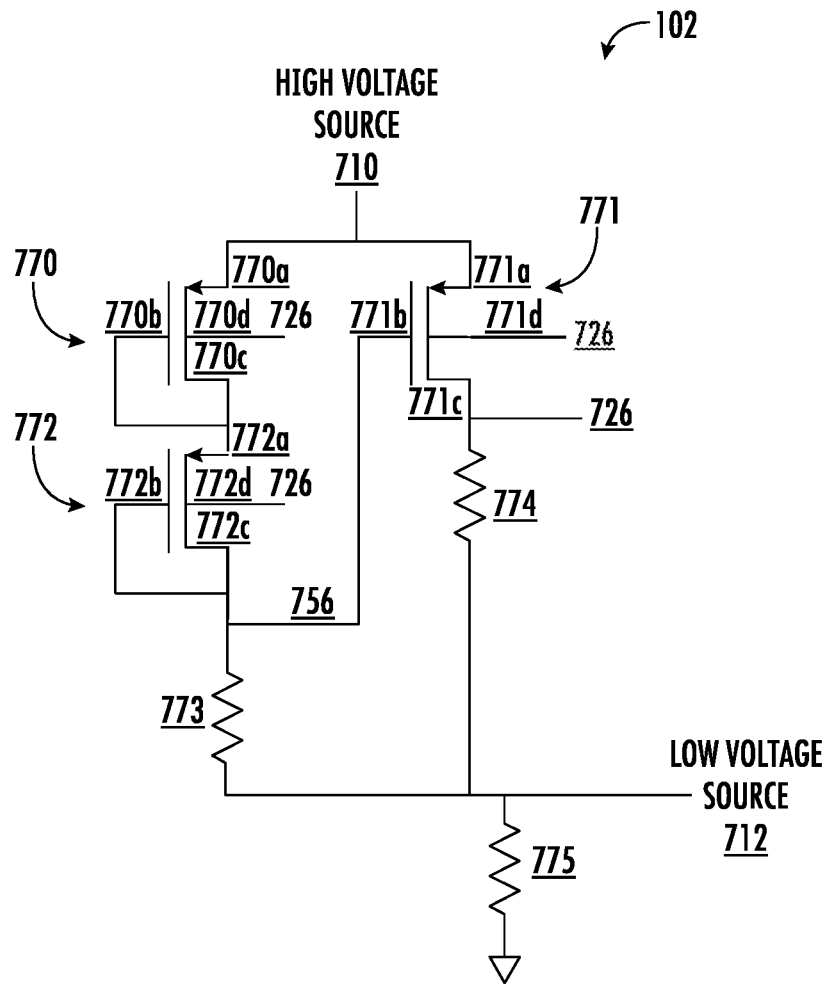
FIG. 7 illustrates an example embodiment of a voltage selection circuit utilizing bulk technology in accordance with an example embodiment of the present disclosure.

Referring now to FIG. 7, an example embodiment of a voltage selection circuit 728 of a supply voltage independent voltage regulator disable circuit is provided. As depicted in FIG. 7, the voltage selection circuit 728 is designed using transistors without FDSOI technology. Thus, the bulk terminal 771d of the second transistor 771 is electrically connected to the selected voltage 726, and the bulk terminals 770d, 772d of the first and third transistors 770, 772 are electrically connected to the selected voltage 726, since the bulk terminal of a non-FDSOI transistor may not be lower than the voltage of the source terminal or the drain terminal on the non-FDSOI transistor. Without the ability to adjust the threshold voltage of the second transistor 771 through FDSOI technology, an additional transistor (third transistor 773) is added to create an additional voltage drop from the high voltage source 710 across the first transistor 770 and the third transistor 772, such that the total voltage drop across the first transistor 770 and the third transistor 772 is sufficiently greater than the required threshold voltage of the second transistor 771.

As such, the example voltage selection circuit 728, includes a first transistor 770 electrically connected in series with a third transistor 772 and a first resistor 773 between the high voltage source 710 and the low voltage source 712. As depicted in FIG. 7, the source terminal 770a of the first transistor 770 is electrically connected to high voltage source 710, the gate terminal 770b is electrically connected to the drain terminal 770c, and the bulk terminal 770d is electrically connected to the selected voltage 726. Further, the source terminal 772a of the third transistor 772 is electrically connected to the drain terminal 770c of the first transistor 770, the gate terminal 772b is electrically connected to the drain terminal 772c, the drain terminal 772c is further electrically connected to the first resistor 773, and the bulk terminal 772d is electrically connected to the selected voltage 726. The first resistor 773 is further electrically connected to the low voltage source 712.

As further depicted in FIG. 7, the voltage selection circuit 728 further includes a second transistor 771 electrically connected in series with a second resistor 774, and a third resistor 775 between the high voltage source 710 and low voltage source 712, and in parallel to the first transistor 770, third transistor 772, and first resistor 773, wherein the voltage at the gate terminal 771b of the second transistor 771 is supplied by the voltage at the drain terminal 772c of the third transistor 772.

As further shown in FIG. 7, the source terminal 771a of the second transistor 771 is electrically connected to the high voltage source 710, the gate terminal 771b is electrically connected to the drain terminal 772c of the third transistor 772, the drain terminal 771c is electrically connected to the second resistor 774, and the bulk terminal 771d is electrically connected to the selected voltage 726. Further, the second resistor 774 is further electrically connected to the third resistor 775. As depicted in FIG. 7, the selected voltage is generated at the drain terminal 771c of the second transistor 771.

As depicted in FIG. 7, the first transistor 770, the third transistor 772, and the first resistor 773 essentially act as a voltage divider with a voltage divider tap 756 generating the output voltage used to control the second transistor 771. Due to the lack of FDSOI technology, there is less flexibility in control of the threshold voltage using the bulk terminal. Thus, the additional transistor (third transistor 772) is added to ensure the voltage difference between the gate terminal 771b and the source terminal 771a at second transistor 771 is high enough to reduce the effective resistance of the second transistor 771.

As further depicted in FIG. 7, the bulk terminals of the transistors (770d, 771d, 772d) are electrically connected to the selected voltage 726. Connecting the bulk terminals to the selected voltage 726 biases the bulk terminal to avoid forward bias of the transistors, for example, when a voltage is present at low voltage source 712 and not at high voltage source 710. In addition to connecting the bulk terminals of the transistors within the voltage selection circuit 728 to the selected voltage 726, any transistor connected to the gate terminal of a transistor may be connected to the selected voltage 726, the bulk terminal of any transistor connected to the gate terminal may be connected to selected voltage 726.

Figure 8:
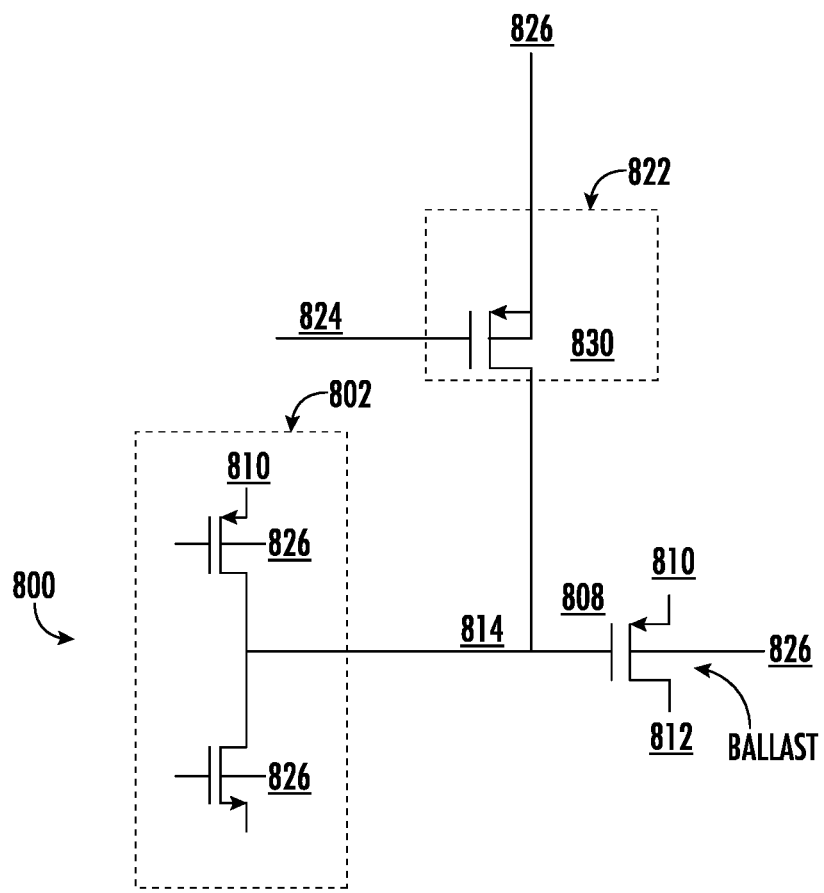
FIG. 8 illustrates an example embodiment of a voltage regulator and power-down switching device utilizing bulk technology in accordance with an example embodiment of the present disclosure.

Referring now to FIG. 8, an example voltage regulator 800 and associated example power-down switching device 822 are depicted. As depicted in FIG. 8, the gate terminal of the power MOSFET 808 of the example voltage regulator 800 receives a regulator gate voltage 814 based on the selected voltage 826 and the power-down output signal 824 as received by the power-down switching device 822. Thus, any transistor connected to the gate terminal of the power MOSFET 808 may receive the selected voltage 826 at the bulk terminal of the transistor. For example, as shown in FIG. 8, the last stage of the operational amplifier 802 may comprise one or more transistors. As shown, the transistors within the last stage of the operational amplifier 802 are powered by the high voltage source 810 and thus may additionally receive the selected voltage 826 at the bulk terminals of the transistors.

Figure 9:
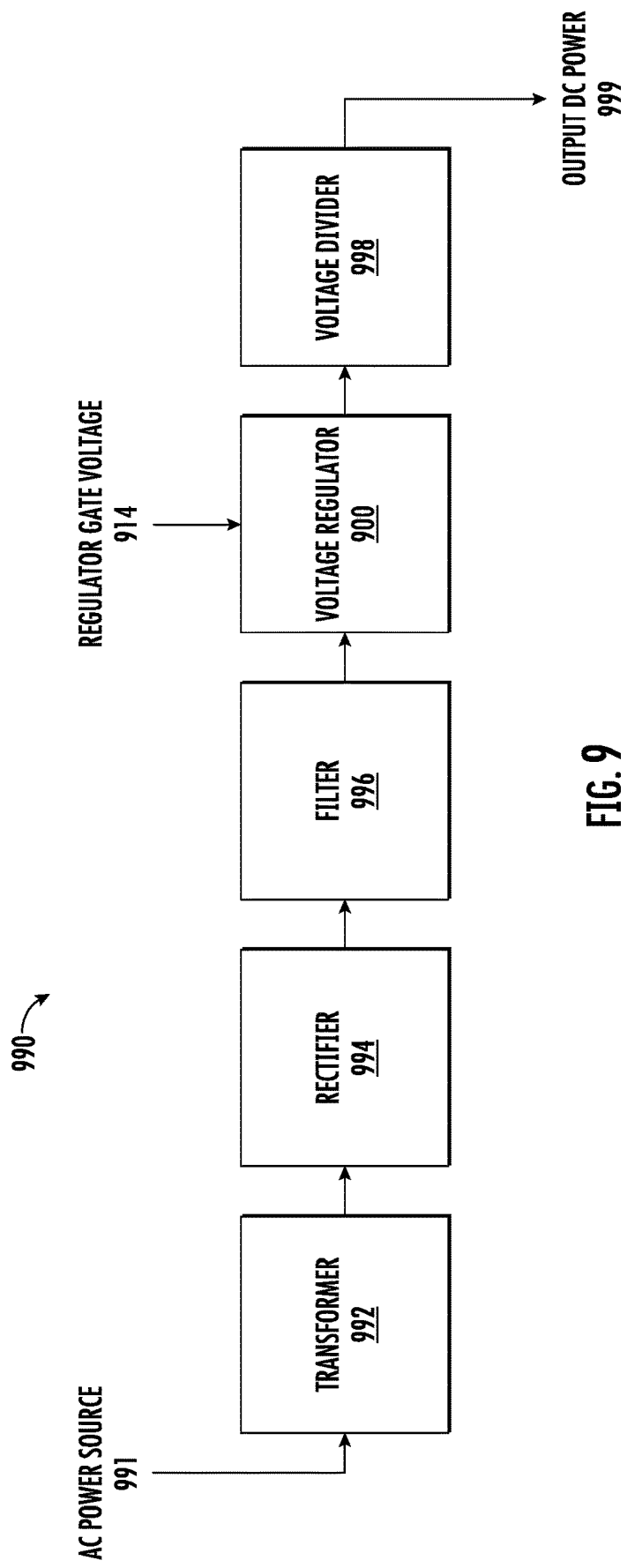
FIG. 9 depicts a system-level block diagram of a PMU comprising a voltage regulator in accordance with an example embodiment of the present disclosure.

Referring now to FIG. 9, an example power management unit (PMU) 990 comprising a voltage regulator 900 disabled by a regulator gate voltage 914 according to one or more embodiments of the present disclosure is provided. As depicted in FIG. 9, the example PMU 990 includes a transformer 992 which may be configured to receive an alternating current (AC) power source 991 and transfer the received electrical energy at the proper voltage level to the rectifier 994. The rectifier 994 may be configured to receive the altered AC power from the transformer 992 and convert the AC power into direct current (DC) power usable by the electronic circuit. As depicted in FIG. 9, the PMU 990 may further include a filter 996 configured to receive DC power from the rectifier 994 and generate a clean (noise reduced) DC power source to be transmitted to the voltage regulator 900. As described herein, the voltage regulator 900 may receive a DC voltage from the filter 996 as a reference voltage (e.g., reference voltage 104). The voltage regulator 900 ensures that the DC voltage supplied to the electrical circuit remains stable, despite fluctuations in the AC power source 991. As further described herein, the voltage regulator 900 may receive a power-down signal (e.g., regulator gate voltage 914, used to shut off the voltage regulator 900, for example, in an instance in which the low voltage supply is supplied by an external source. The voltage output of the voltage regulator 900 is transmitted to a voltage divider 998. The voltage divider 998 may be configured to generate one or more lower voltages based on the voltage generated by the voltage regulator 900. The output DC power 999 of the voltage divider 998 may be utilized as a power source to various electrical components of an electrical device, processor, core logic of a system-on-chip, or other electrical components.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that utilizes a voltage regulator. For example, a power supply, a battery charger, a mobile device, a system-on-chip, or other similar electrical devices, particularly electrical devices utilizing a high voltage power source. Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An electrical circuit comprising:
 a voltage selection circuit configured to receive a first voltage source and a second voltage source, and further configured to output a selected voltage, the voltage selection circuit comprising:
  a first transistor component having a first transistor component source, a first transistor component gate, and a first transistor component drain,
   wherein the first transistor component source is electrically connected to the first voltage source, and
   wherein the first transistor component gate is electrically connected to the first transistor component drain;
  a second transistor component having a second transistor component source, a second transistor component gate, and a second transistor component drain,
   wherein the second transistor component source is electrically connected to the first voltage source, and
   wherein a second transistor gate voltage at the second transistor component gate is generated based at least in part on a first transistor component drain voltage at the first transistor component drain,
  wherein the selected voltage is generated based at least in part on a second transistor drain voltage at the second transistor component drain; and
 a power-down switching device configured to generate a regulator gate voltage for a voltage regulator based at least in part on the selected voltage.

2. The electrical circuit of claim 1, wherein the power-down switching device further comprises:
 a pull-up switching component having a pull-up transistor source, a pull-up transistor gate, and a pull-up transistor drain,
  wherein the pull-up transistor source is electrically connected to the selected voltage of the voltage selection circuit, and wherein the pull-up transistor gate is electrically connected to a power-down output signal of a power-down generator circuit.

3. The electrical circuit of claim 2, wherein the power-down generator circuit is configured to receive the first voltage source and a power-down signal, wherein the power-down generator circuit further comprises:
a power-down voltage divider electrically connected to the first voltage source and the power-down signal;
wherein the power-down voltage divider is enabled by the power-down signal, and
wherein the power-down voltage divider generates the power-down output signal based at least in part on a voltage difference between the first voltage source and the power-down signal.

4. The electrical circuit of claim 1, wherein the voltage selection circuit further comprises:
a first voltage selection circuit voltage divider electrically connected to the first transistor component drain of the first transistor component and the second voltage source;
wherein the first voltage selection circuit voltage divider is configured to generate a first voltage divided output based on a voltage difference between the first transistor component drain voltage at the first transistor component drain and the second voltage source, and
wherein the first voltage divided output is electrically connected to the second transistor component gate of the second transistor component.

5. The electrical circuit of claim 4, wherein the voltage selection circuit further comprises:
a second voltage selection circuit voltage divider electrically connected to the selected voltage and a ground, wherein a second voltage selection circuit voltage divider tap is electrically connected to the second voltage source.

6. The electrical circuit of claim 5, wherein the second voltage selection circuit voltage divider comprises:
a second voltage selection circuit voltage divider first resistive component electrically connected to the selected voltage and the second voltage selection circuit voltage divider tap;
the second voltage selection circuit voltage divider tap; and
a second voltage selection circuit voltage divider second resistive component electrically connected to the ground and the second voltage selection circuit voltage divider tap,
wherein a resistive value of the second voltage selection circuit voltage divider first resistive component is greater than the resistive value of the second voltage selection circuit voltage divider second resistive component.

7. The electrical circuit of claim 3, wherein the power-down voltage divider comprises:
a power-down voltage divider first resistive component electrically connected to the first voltage source and the power-down output signal;
a power-down voltage divider tap electrically connected to the power-down output signal; and
a power-down voltage divider second resistive component electrically connected to the power-down voltage divider tap and the power-down signal.

8. The electrical circuit of claim 7, wherein the power-down voltage divider further comprises:

a first power-down transistor component having a first power-down transistor component source, a first power-down transistor component gate, and a first power-down transistor component drain,
wherein the first power-down transistor component drain is electrically connected to the power-down voltage divider tap,
wherein the first power-down transistor component source is electrically connected to the power-down voltage divider second resistive component, and the first power-down transistor component gate, and
wherein the first power-down transistor component gate is further connected to a floating voltage supply block.

9. The electrical circuit of claim 8, wherein the power-down voltage divider further comprises:
a second power-down transistor component having a second power-down transistor component source, a second power-down transistor component gate, and a second power-down transistor component drain,
wherein the second power-down transistor component drain is electrically connected to the power-down voltage divider second resistive component,
wherein the second power-down transistor component gate is electrically connected to the power-down signal, and
wherein the second power-down transistor component source is electrically connected to ground.

10. The electrical circuit of claim 9, wherein a conductive path diode is electrically connected between the power-down voltage divider tap and the first power-down transistor component gate.

11. The electrical circuit of claim 10, wherein the floating voltage supply block generates a floating supply voltage based on a voltage output of the first voltage source.

12. The electrical circuit of claim 1, wherein the first transistor component and the second transistor component are p-type metal-oxide-semiconductor field-effect transistors.

13. The electrical circuit of claim 9, wherein the first power-down transistor component and the second power-down transistor component are n-type metal-oxide-semiconductor field-effect transistors.

14. The electrical circuit of claim 1, wherein the voltage regulator comprises:
an operational amplifier having a first input and a second input,
wherein the first input is electrically connected to a reference voltage;
a voltage regulator transistor component having a voltage regulator transistor component source, a voltage regulator transistor component gate, and a voltage regulator transistor component drain,
wherein the voltage regulator transistor component source is electrically connected to an output of the operational amplifier,
wherein the voltage regulator transistor component gate is electrically connected to the output of the operational amplifier and to the regulator gate voltage; and
wherein the voltage regulator transistor component drain is electrically connected to the second input of the operational amplifier.

15. A power management unit comprising:
a transformer;
a rectifier circuit electrically connected to the transformer;

a filter circuit electrically connected to the rectifier circuit; and a voltage regulator, the voltage regulator comprising:

a voltage selection circuit configured to receive a first voltage source and a second voltage source, and further configured to output a selected voltage, the voltage selection circuit comprising:

a first transistor component having a first transistor component source, a first transistor component gate, and a first transistor component drain, wherein the first transistor component source is electrically connected to the first voltage source, and wherein the first transistor component gate is electrically connected to the first transistor component drain;

a second transistor component having a second transistor component source, a second transistor component gate, and a second transistor component drain, wherein the second transistor component source is electrically connected to the first voltage source, and wherein a second transistor component gate voltage at the second transistor component gate is generated based at least in part on a first transistor component drain voltage at the first transistor component drain;

wherein the selected voltage is generated based at least in part on a second transistor component drain voltage at the second transistor component drain; and a power-down switching device configured to generate a regulator gate voltage for the voltage regulator based at least in part on the selected voltage.

16. The power management unit of claim 15, wherein the voltage regulator comprises:

an operational amplifier having a first input and a second input, wherein the first input is electrically connected to a reference voltage;

a voltage regulator transistor component having a voltage regulator transistor component source, a voltage regulator transistor component gate, and a voltage regulator transistor component drain, wherein the voltage regulator transistor component source is electrically connected to an output of the operational amplifier, wherein the voltage regulator transistor component gate is electrically connected to the output of the operational amplifier and to the regulator gate voltage; and wherein the voltage regulator transistor component drain is electrically connected to the second input of the operational amplifier.

17. The power management unit of claim 15, wherein the power-down switching device further comprises:

a pull-up switching component having a pull-up transistor source, a pull-up transistor gate, and a pull-up transistor drain, wherein the pull-up transistor source is electrically connected to the selected voltage of the voltage selection circuit, and wherein the pull-up transistor gate is electrically connected to a power-down output signal of a power-down generator circuit.

18. The power management unit of claim 17, wherein the power-down generator circuit is configured to receive the first voltage source and a power-down signal, and wherein the power-down generator circuit further comprises:

a power-down voltage divider electrically connected to the first voltage source and the power-down signal;

wherein the power-down voltage divider is enabled by the power-down signal, and wherein the power-down voltage divider generates the power-down output signal based at least in part on a voltage difference between the first voltage source and the power-down signal.

19. The power management unit of claim 15, wherein the voltage selection circuit further comprises:

a first voltage selection circuit voltage divider electrically connected to the first transistor component drain of the first transistor component and the second voltage source;

wherein the first voltage selection circuit voltage divider is configured to generate a first voltage divided output based on a voltage difference between the first transistor component drain voltage at the first transistor component drain and the second voltage source, and wherein the first voltage divided output is electrically connected to the second transistor component gate of the second transistor component.

20. The power management unit of claim 19, wherein the voltage selection circuit further comprises:

a second voltage selection circuit voltage divider electrically connected to the selected voltage and a ground, wherein a second voltage selection circuit voltage divider tap is electrically connected to the second voltage source.

* * * * *